United States Patent [19]
Petersen

[11] Patent Number: 5,364,114
[45] Date of Patent: Nov. 15, 1994

[54] VEHICLE STEERING AND SUSPENSION SYSTEM

[75] Inventor: Walter J. Petersen, Hennepin County, Minn.

[73] Assignee: The Toro Company, Bloomington, Minn.

[21] Appl. No.: 11,285

[22] Filed: Jan. 29, 1993

[51] Int. Cl.$^5$ ............................................. B60G 11/08
[52] U.S. Cl. ...................... 280/95.1; 267/248;
280/98; 280/103; 280/663; 280/666; 280/667;
280/696
[58] Field of Search ............ 280/93, 94, 95.1, 96,
280/660, 667, 666, 663, 98, 103, 691, 696, 693;
267/248, 254, 256

[56] References Cited

U.S. PATENT DOCUMENTS

| Re. 23,147 | 9/1949 | Borjeson | 280/96.2 |
|---|---|---|---|
| 1,799,082 | 3/1931 | Bluhm | 267/248 |
| 2,007,952 | 7/1935 | Armstrong | 267/20 |
| 2,011,239 | 8/1935 | Christman | 267/20 |
| 2,044,809 | 6/1936 | Rabe | 280/96 |
| 2,113,071 | 4/1938 | Allen | 267/15 |
| 2,113,094 | 4/1938 | Paton | 280/124 |
| 2,128,660 | 8/1938 | Moorhouse | 267/248 |
| 2,186,065 | 1/1940 | Fischer | 280/124 |
| 2,643,110 | 6/1953 | Gregoire | 267/28 |
| 2,776,147 | 1/1957 | Bamford | 280/124 |
| 3,059,944 | 10/1962 | Goodacre | 280/95.1 |
| 3,292,945 | 12/1966 | Dangauthier | |
| 3,679,017 | 7/1972 | Roe | 180/73 |
| 3,747,950 | 7/1973 | Hager | 280/124 |
| 3,768,825 | 10/1973 | Magnusson | 280/96 |
| 3,787,073 | 1/1974 | Lievore | 280/124 |
| 4,566,717 | 1/1986 | Arthur et al. | 280/701 |
| 4,740,013 | 4/1988 | Pierce, Jr. | 280/701 |

FOREIGN PATENT DOCUMENTS

| 636068 | 3/1928 | France . | |
|---|---|---|---|
| 1425503 | 4/1966 | France . | |
| 1176008 | 8/1964 | Germany | 280/95.1 |
| 442411 | 11/1948 | Italy . | |
| 582457 | 9/1958 | Italy . | |

*Primary Examiner*—Eric D. Culbreth
*Attorney, Agent, or Firm*—David George Johnson

[57] ABSTRACT

A steering and suspension mechanism for use with a vehicle (1) and including a steering gear (14) interconnected to a steering wheel (8) through a series of universal joints (10, 11, 12, 13, 87). An output of the steering gear (14) is connected to a Pitman arm (21) which extends from a point (31) relatively near the axle (34) to a point (22) relatively far from the axle, where the Pitman (21) is pivotably interconnected to a pair of tie rods (25, 26). Extending upwardly from the wheels (6, 7) are a pair of A-frame members (40, 81) which pivotably support end caps (42, 47). A pair of coil springs (45, 46) are retained between the end caps, the faces (50, 51) of the end caps being preserved in a parallel relationship by linkages (56, 61), thus preventing buckling of the coil springs (45, 46).

3 Claims, 8 Drawing Sheets

VEHICLE STEERING AND SUSPENSION SYSTEM

FIELD OF THE INVENTION

The present invention relates generally to an apparatus and method for controlling various motions of wheels when mounted on a motor vehicle, and more specifically to mechanisms for decreasing the turning radius of such vehicles while providing independent shock absorption for each coaxial wheel.

BACKGROUND OF THE INVENTION

Utility vehicles for use in the agricultural, lawn and golf course maintenance fields typically travel directly upon the turf surface being maintained. Such vehicles must often support a substantial weight (greater than one ton) on a frame having a relatively short wheelbase. Inherent in such applications is the need to travel over uneven terrain, freshly watered grass or recently planted soil. Obstacles such as shrubbery, sand traps and trees are also often encountered.

Utility vehicles of this type are often used to apply fertilizer, pesticides or other surface treatments to the turf being maintained. In order to provide complete ground coverage, the vehicle must approach as closely as possible the various obstacles, such as trees and fences, which are often present in such areas. This requires that the turning radius of such a vehicle be as small as possible.

In order to prevent damage to the turf and to promote safety while traveling in off road environments, the maximum speed of many utility vehicles is limited to approximately twenty miles per hour. Unfortunately, this encourages the tendency to drive at maximum speed under most conditions, including during maximum steering wheel deflection turns. Since scuffing of the turf or soil is unacceptable, each wheel must follow a coordinated, non-skid path regardless of vehicle speed, terrain conditions or radius of turn.

Unfortunately, past utility vehicles have not provided a complete solution to these various problems. For example, maximum wheel deflection has been limited to approximately forty-five degrees to ensure proper tracking along an ideal "Ackerman" arc. Attempts to provide greater maximum deflection have required solutions too complex for use in utility vehicle applications.

Similarly, the great weight carried by such vehicles while traveling over uneven terrain has necessitated the implementation of substantial shock absorption capability at each axle. Conventional methods have utilized a substantially vertically oriented spring, or other damping device, mounted between the wheel support structure and the vehicle frame. The effect of such an arrangement, however, is a tendency, for example, to lift the rear wheel of the vehicle when the front wheel encounters a bump or mogul requiring significant vertical displacement of the wheel. This results in reduced traction of the rear wheel which resides on the same side of the vehicle as the displaced front wheel.

In an effort to overcome the aforementioned problems, various solutions involving horizontally mounted springs or shock absorbers have been proposed. For example, U.S. Pat. No. 3,292,945, issued to Dangauthier, discloses a "damping collecting means" including two tubular telescoping elements having ends pivotably attached, through various linkages, to the wheel supports. When the wheels are deflected upwardly by an impulse load, the "damping connecting means" (shock absorber) is compressed and applies a reaction force to the wheel tending to urge the wheel downwardly so as to maintain (or reestablish) ground contact. A similar device is also disclosed in U.S. Pat. No. 4,740,013, issued to Pierce, Jr., which differs from Dangauthier primarily in the rigid attachment of the shock absorber housing to the vehicle frame. Both of the aforementioned devices suffer from the drawback of requiring a relatively sophisticated dampening element, including a housing, O-rings, biasing springs, return springs, pistons and hydraulic fluid, as well as periodic maintenance and replacement.

In a utility vehicle of the type contemplated herein, the designer, manufacturer and end user would much prefer to utilize a simpler dampening element, such as a spring, while maintaining the desired horizontal orientation. An effort to employ a horizontally oriented spring in a shock absorption function is disclosed, for example, in U.S. Pat. No. 3,747,950, issued to Hager. The Hager device utilizes a spring confined between two end plates, but suffers from the problem of spring "buckling", which occurs when the end plates assume a non-parallel configuration. The non-parallel end plate orientation is a heretofore inevitable result of relative movement between the wheel support and vehicle frame which occurs whenever an impulse load is applied to the wheel. This buckled condition causes the shock absorption effectiveness of the spring to be diminished, and necessitates the use of centering and retaining members within the spring (such as disclosed by Hager) in order to prevent the spring from being completely ejected from its end plate cradle.

SUMMARY OF THE INVENTION

The present invention addresses some of the shortcomings of previous designs by providing a steering and suspension mechanism that permits large angular deflections of the wheels for turning purposes, as well as providing independent suspension of each wheel with the use of a conventional, horizontally mounted spring. The large steering deflection is obtained by mounting a pitman arm on the steering gear output such that the pivot point of the Pitman arm extends from a point "on" or overlying the axle and follows a path away from the axis defined by the axle and continues to a point substantially behind the axle, for example. Depending on the particular layout of the vehicle, the pivot point of the Pitman arm could also be either behind the axle or in front of the axle. Each tie rod extends between the pitman arm and its associated steering arm, each tie rod thereby crossing the axis defined by the axle. Due to the particular geometry chosen the wheels may be deflected through an arc of approximately 120 degrees (seventy degrees in a first direction and fifty degrees in an opposite direction.

Also attached to the structural members linking the wheels to the vehicle frame is an "A-Frame" arrangement which supports a spring cradle. The spring cradle includes two end plates, suitably spaced to retain at least one conventional coil spring, chosen to have substantially zero bias when the vehicle wheels are in a nominal, level attitude. When either wheel is deflected upwardly, the spring is compressed and thereby urges the other, opposite wheel in a downward direction or, depending on the magnitude of the deflection, lifts the vehicle. A pivotable linkage is placed between each end plate and the vehicle frame, the geometry of the linkages being chosen such that the planar faces defined by the end plates remain nearly parallel to each other regardless of the amount of spring compression. By preserving this parallel orientation, the spring is prevented from "buckling" even during periods of substantial compression.

Additional features and aspects of the present invention are described in detail below with reference to the drawings.

BRIEF DESCRIPTION OF THE DRAWINGS

With reference to the Figures, wherein like numerals represent like parts and assemblies throughout the several views.

DETAILED DESCRIPTION OF THE INVENTION

Figure 1:
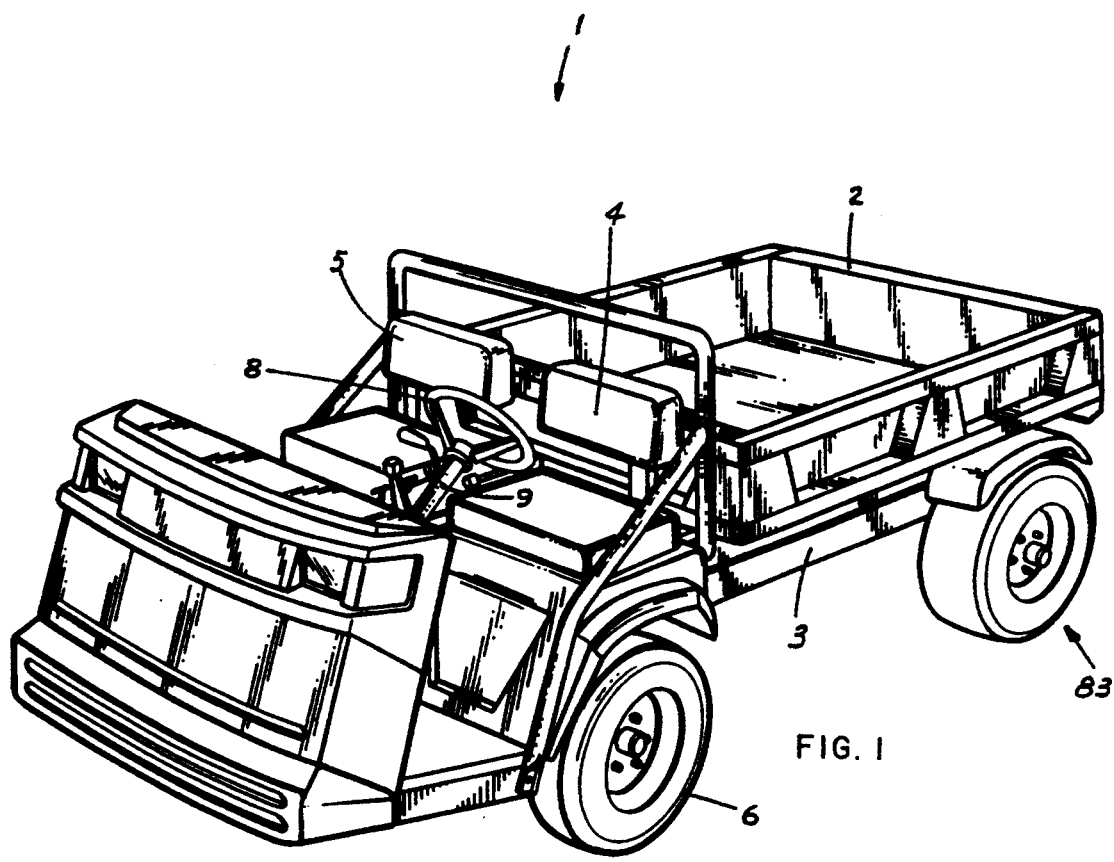
FIG. 1 is a perspective view of a utility vehicle that utilizes the apparatus and method of the present invention.

With reference to the drawings, wherein like reference numerals designate like parts and assemblies throughout the several views, FIG. 1 depicts a utility vehicle 1 having a cargo bed 2 attached to a rigid frame 3. A vehicle operator and passenger (not shown) ride in seats 4 and 5, respectively. A prime mover, such as an internal combustion engine (not shown) is mounted on the frame 3 and drives, in this case, rear wheels 83. The front wheels could also be driven, and the present invention is equally applicable for use in conjunction with either the rear wheels or the front wheels, regardless of whether the vehicle is front wheel, rear wheel or all wheel drive. Steering of the vehicle is controlled by conventional manipulation of the steering wheel 8.

Figure 2:
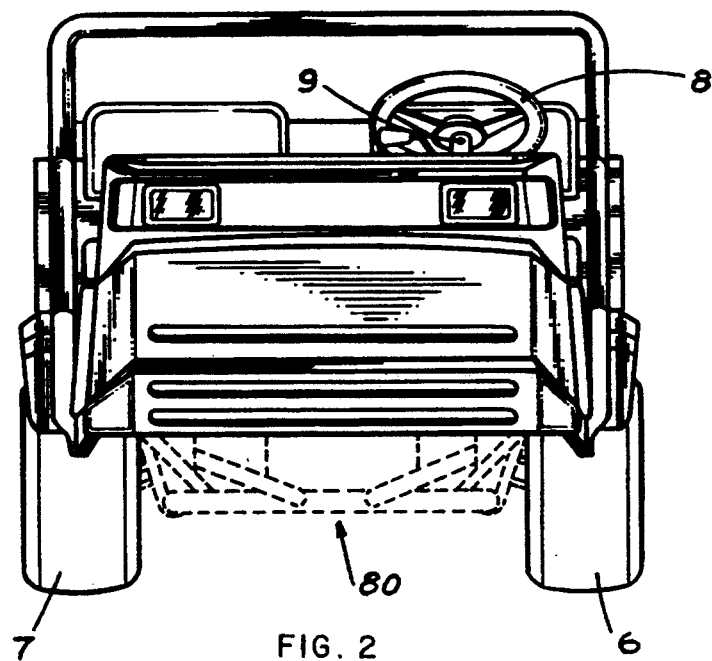
FIG. 2 is a front elevation view of the utility vehicle depicted in FIG. 1.

As can be seen in FIG. 2, the wheels 6 and 7 are supported on framework 80 which serves as a foundation for the various components which make up the steering and suspension mechanism of the present invention.

Figure 3:
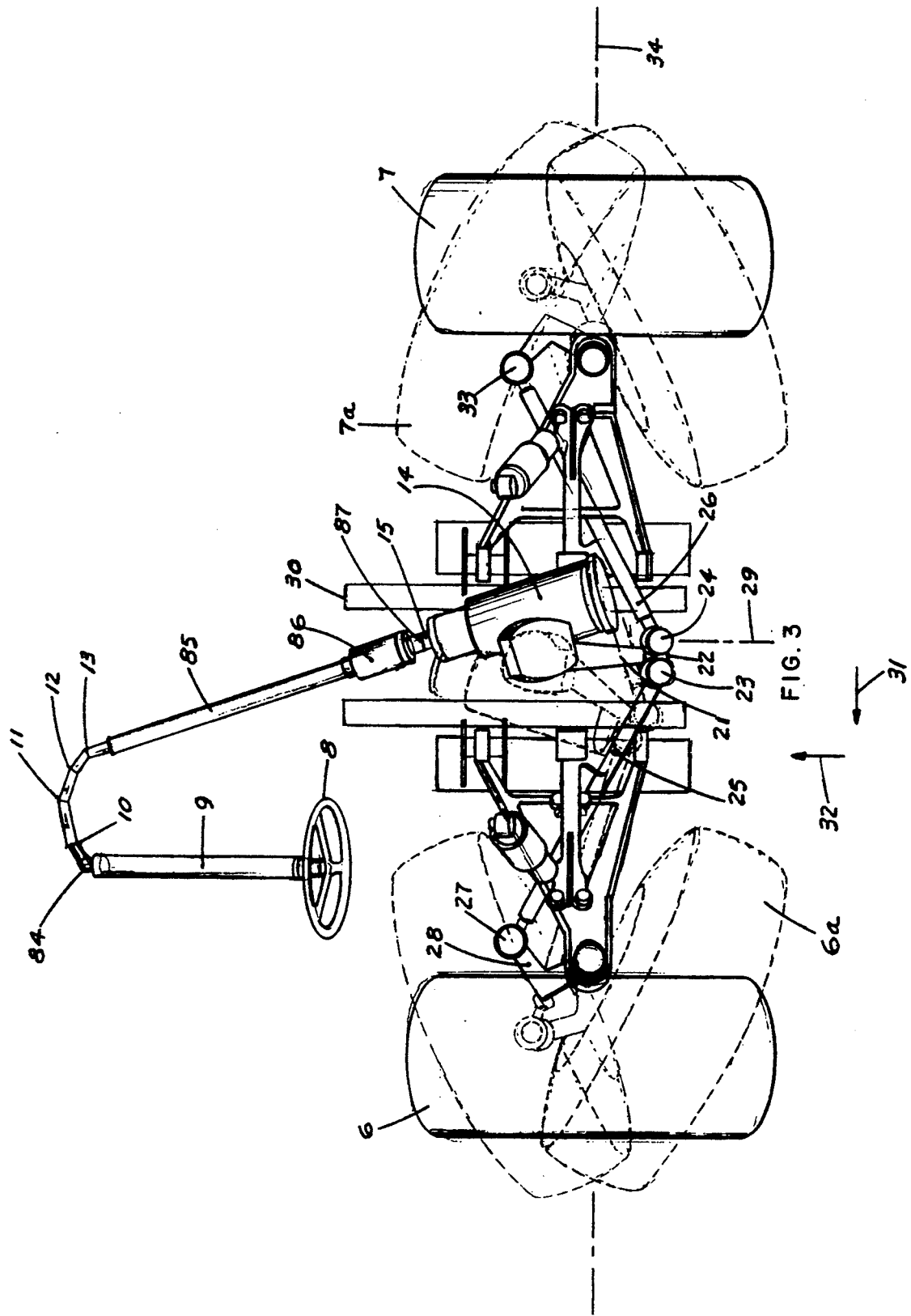
FIG. 3 is a plan view of some components of the improved suspension and steering mechanism as utilized in the vehicle depicted in FIG. 1, with positions of maximum wheel turn angle shown in phantom.
Figure 4:
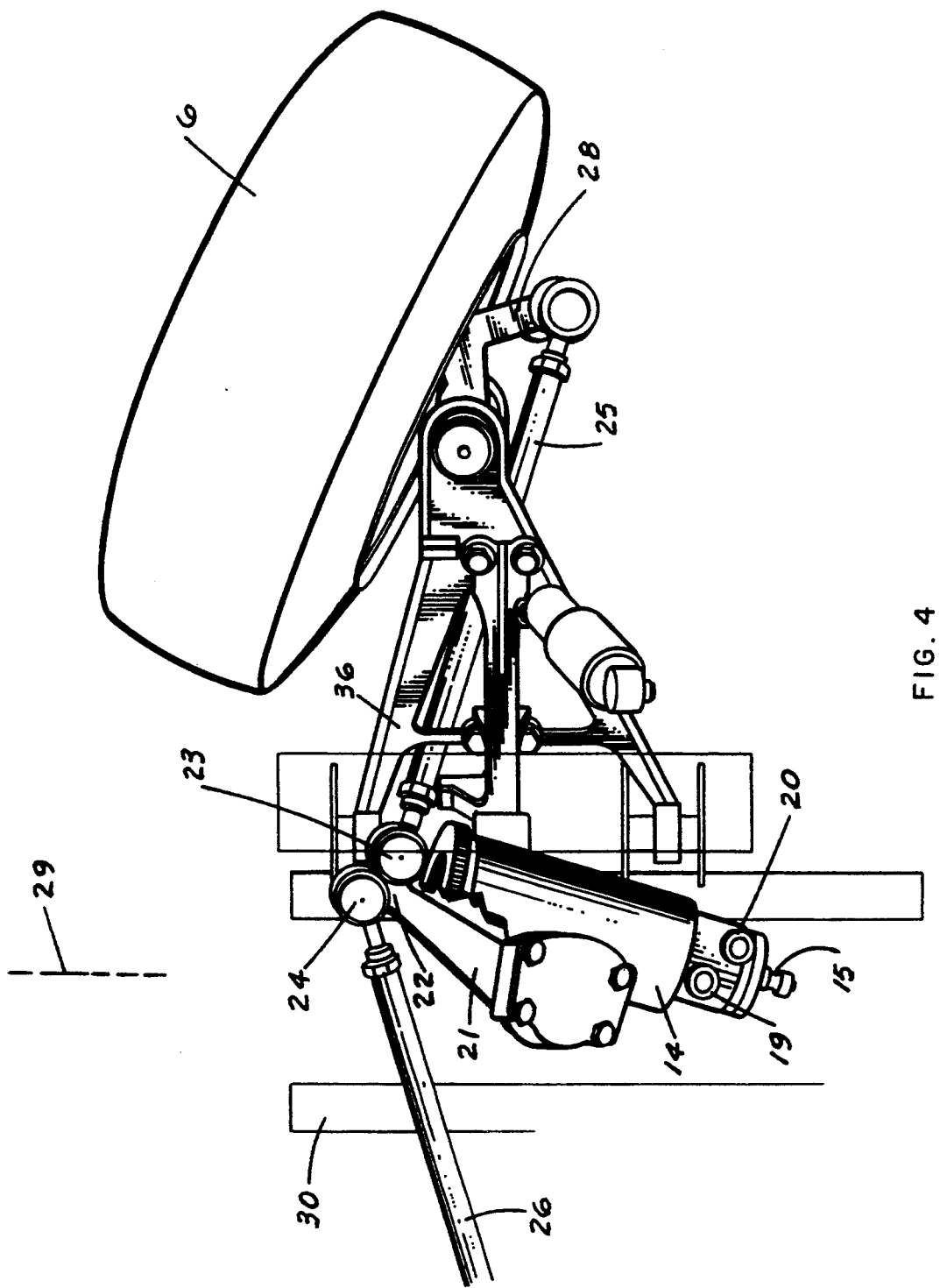
FIG. 4 is a plan view of a portion of the improved mechanism of the present invention as depicted in FIG. 3.
Figure 5:
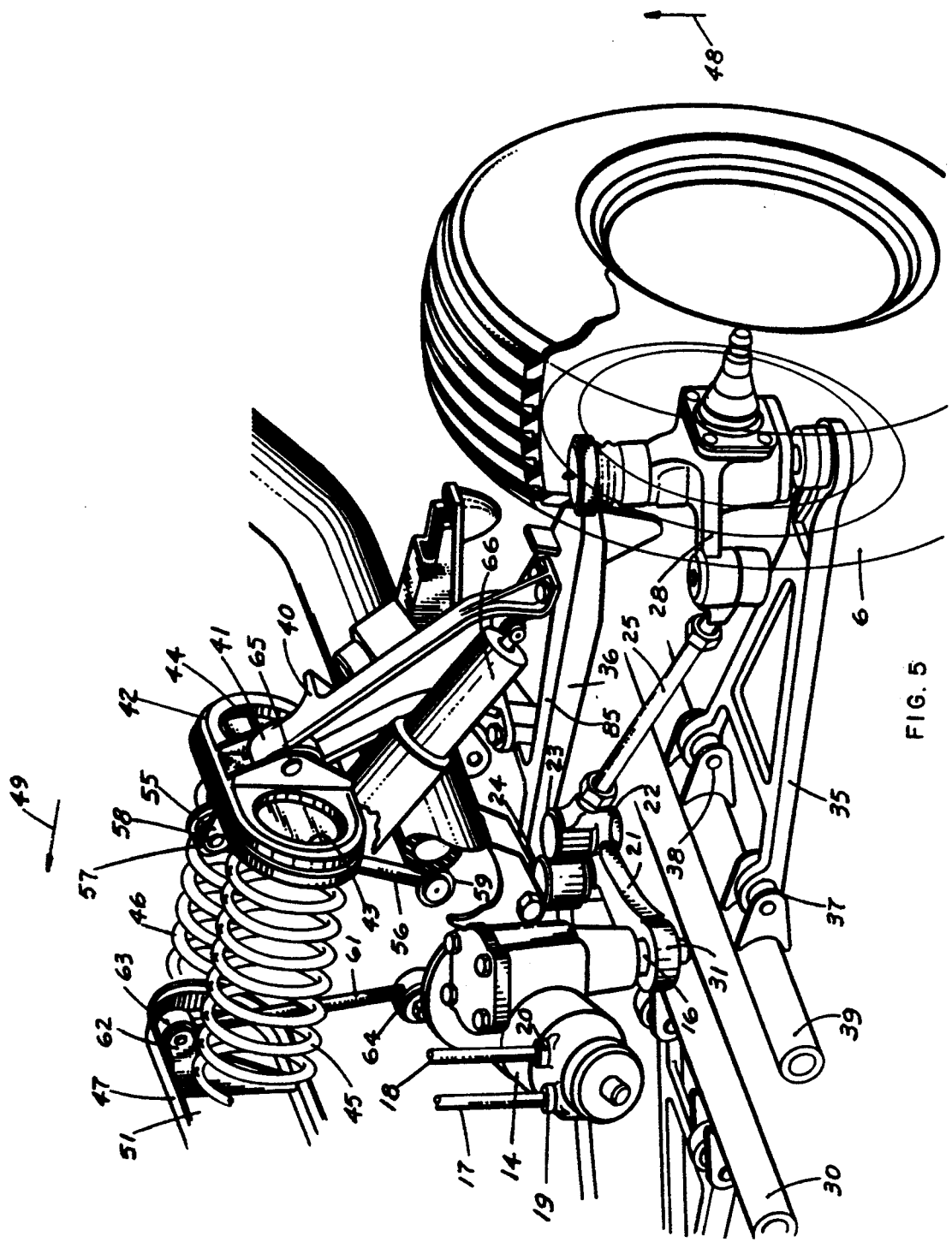
FIG. 5 is a perspective view of the improved suspension and steering mechanism as utilized in the vehicle depicted in FIG. 1.

Referring now to FIG. 3, the basic principles of the steering gear and its associated equipment can be understood. The steering wheel 8 is linked through a steering column 9 to a series of universal joints 10, 11, 12, 13 and 87 interconnected in a serial fashion. The output of universal joint 13 is affixed to column 85 which is attached to slip joint 86, the slip joint 86 being coupled to universal joint 87 and thus to input shaft 15 of integral steering gear 14. This permits the operation of integral steering gear 14 regardless of the relative positions of the steering wheel 8 and gear 14. The steering gear itself is a rotary valve power steering gear. An integral gear suitable for this type of application is manufactured by the Saginaw Division of General Motors Corporation in Saginaw, Mich. A rotary input applied to shaft 15 of the gear 14 causes the application of a hydraulically assisted torsional output at vertical shaft 16, as can be seen in FIG. 5. Hydraulic fluid is applied to gear 14 through hydraulic fluid supply lines 17 and 18 which enter gear 14 through ports 19 and 20, respectively.

The vertical output shaft 16 is pivotably interconnected to a Pitman arm 21, which in the preferred embodiment is approximately seven inches in length. The particular length of arm 21 is selected to provide sufficient displacement of end 22 in response to rotation of shaft 16 such that the desired maximum rotation of wheels 6 and 7 is obtained upon full deflection of steering wheel 8. The end 22 of Pitman 21 is formed so as to have two adjacent mounting holes so as to pivotably retain the ends 23 and 24 of tie rods 25 and 26, respectively.

Tie rod 25 includes a second, opposite end 27 which is pivotally attached to steering arm 28. The steering arm 28 is rigidly attached to wheel 6. As seen in FIG. 3, the Pitman arm 21 is oriented along longitudinal axis 29 when wheels or tires 6 and 7 are aligned with vehicle frame element 30, that is, when the tires are aligned so as to cause the vehicle 1 to travel along a straight path. As Pitman arm 21 is rotated by steering gear 14, the first end 31 of arm 21 continues to reside on axis 29, but the arm 21 is no longer parallel to the axis 29, due to the displacement of the second end 22 of arm 21. If the vehicle 1 is turning left, steering gear 14 will cause end 22 to move in the direction of arrow 31 as well as in the direction of arrow 32. Tie rod 25 will therefore push steering arm 28 in the direction of arrow 31, causing wheel 6 to rotate and assume, for example, the position of wheel 6a. Note that a corresponding motion is occurring with wheel 7, insofar as tie rod 26 is pulling steering arm 33 in the direction of arrow 31, causing wheel 7 to assume the position, for example, of wheel 7a.

The extreme degree of rotation is possible because of several novel features. First, Pitman arm 21 extends a substantial distance from lateral axis 34, which corresponds to the axis upon which wheels 6 and 7 are mounted. While pivoting end 16 is relatively near the axis 34, the end 22 is well displaced from (in this case, behind) the axis. Second, the tie rods 25 and 26 each straddle axis 34, thereby extending from a point well behind the axle (where they join Pitman arm 21) to a point well forward of axis 34 (where they join their respective steering arms 27 and 33). The length of the Pitman arm 21, when coupled with the unique geometry of the arm and tie rods with respect to the axle 34, permits the wheels 6 and 7 to be deflected on the order of seventy degrees from longitudinal axis 29, depending on whether the wheel is on the "inside" or "outside" of the turn. Specifically, in a preferred embodiment, the inside wheel turns through an arc of seventy degrees, while the outside wheel turns through an arc of fifty degrees.

As seen in FIG. 5, which for convenience depicts only wheel 6, the steering arm 28 is supported by a lower support member 35 and an upper support member 36. Each of these members is ultimately secured to vehicle frame 3, as for example, by pivotable attachments 37 and 38 which join frame element 39. Rigidly attached to upper support member 36 is a support arm 40, which is inclined at an approximate forty five degree angle to the plane defined by upper support member 36. Pivotably attached to the upper end 41 of support arm 40 is an end cap 42, which in a preferred embodiment is formed to have at least two circular depressions 43 and 44. These depressions form raised areas (not visible in FIG. 5) on the opposite side of end cap 42, the raised areas being suitably dimensioned to retain the ends of coil springs 45 and 46.

The springs 45 and 46 are thus retained between end cap 42 and corresponding end cap 47. A single spring may be used in some applications, or multiple springs may be employed, such as is shown here, depending on the tradeoff between the physical mounting space available and the desired spring characteristics.

As may seen in FIG. 5, movement of wheel 6 in the direction of arrow 48 will cause end cap 42 to move in the direction of arrow 49, thereby compressing springs 45 and 46. This compressive force creates a reaction force by the springs against end cap 42, thereby urging wheel 7 into contact with the ground. More specifically, at slow speeds the springs 45 and 46 may not deflect (depending on spring stiffness), but instead the front of the vehicle will be raised by a distance equal to one half of the amount of the wheel deflection. At faster speeds, the springs will typically compress somewhat and the vehicle will also be raised by some amount. The physical deflection of springs 45 and 46 tends to minimize movement of the vehicle frame 3 in response to vertical movement of the wheels, thereby absorbing shock.

Figure 6:
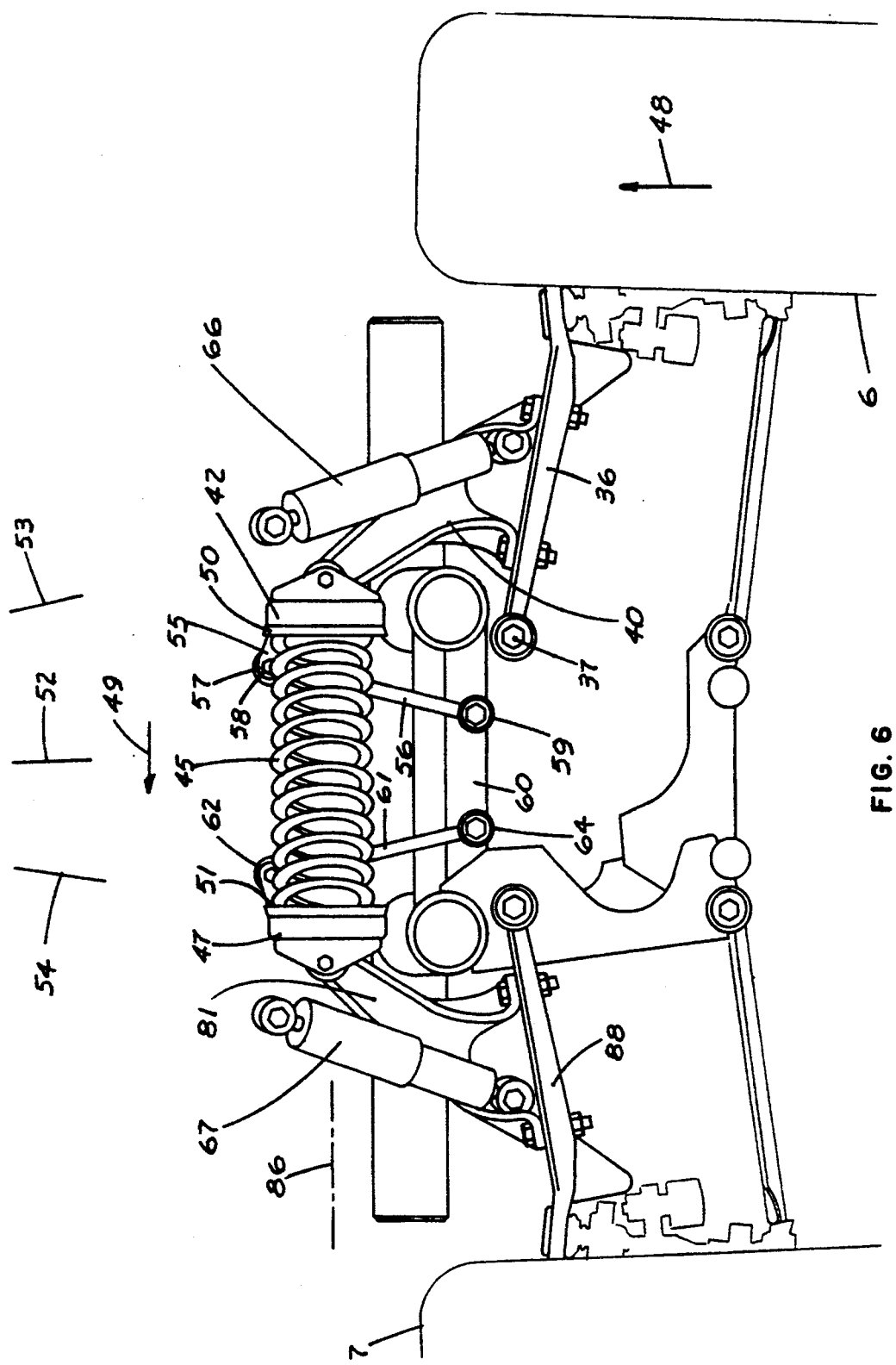
FIG. 6 is a front elevation view of a portion of the improved mechanism of the present invention as depicted in FIG. 5.
Figure 7:
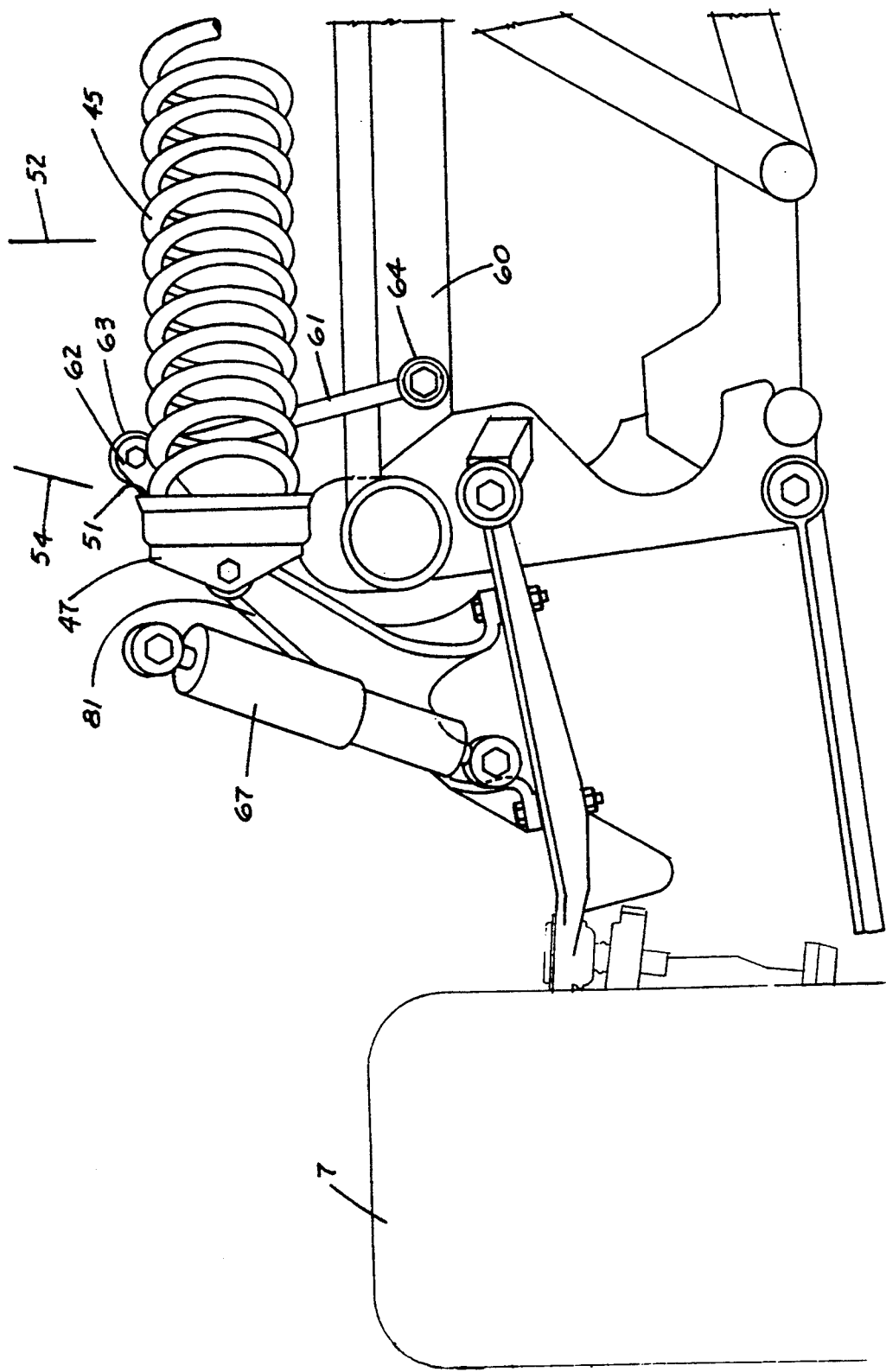
FIG. 7 is a front elevation view of a portion of the improved suspension and steering mechanism of the present invention, showing the structural relationship between the coil spring and one wheel.

Referring now to FIGS. 6 and 7, the action of the end caps 42 and 47 under varying conditions can be appreciated. In a nominal, "no load" condition, such as when the vehicle 1 is at rest, the faces 50 and 51 of caps 42 and 47, respectively, assume an orientation parallel to the vertical line 52, depicted above spring 45 in the figures. However, when wheel 6 is deflected upwardly, cap face 50 would naturally tend to assume the orientation of line 53, that is, somewhat inclined to the vertical, and no longer parallel to line 52. This is because the movement of support member 36 is not purely translational in the direction of arrow 48, but is actually rotational about joint 37. Thus, cap face 50 is not being purely translated in the direction of arrow 49, but is instead being rotated, thereby tilting cap face 50 to the orientation, for example, of line 53.

Similarly, an upward deflection of wheel 7 in the direction of arrow 48 would tend to cause cap face 51 to rotate somewhat, thereby assuming an orientation similar to line 54. This inclination or tilting of the cap faces 50 and 51 during compression of the springs 45 and 46 causes the spring to exert a reaction force that is not entirely parallel to the longitudinal axis of the spring, but instead contains a component that is perpendicular to the springs' longitudinal axes. This perpendicular component creates a tendency for the spring to "buckle" and be ejected from its cradle between the end caps 42 and 47.

Figure 9:
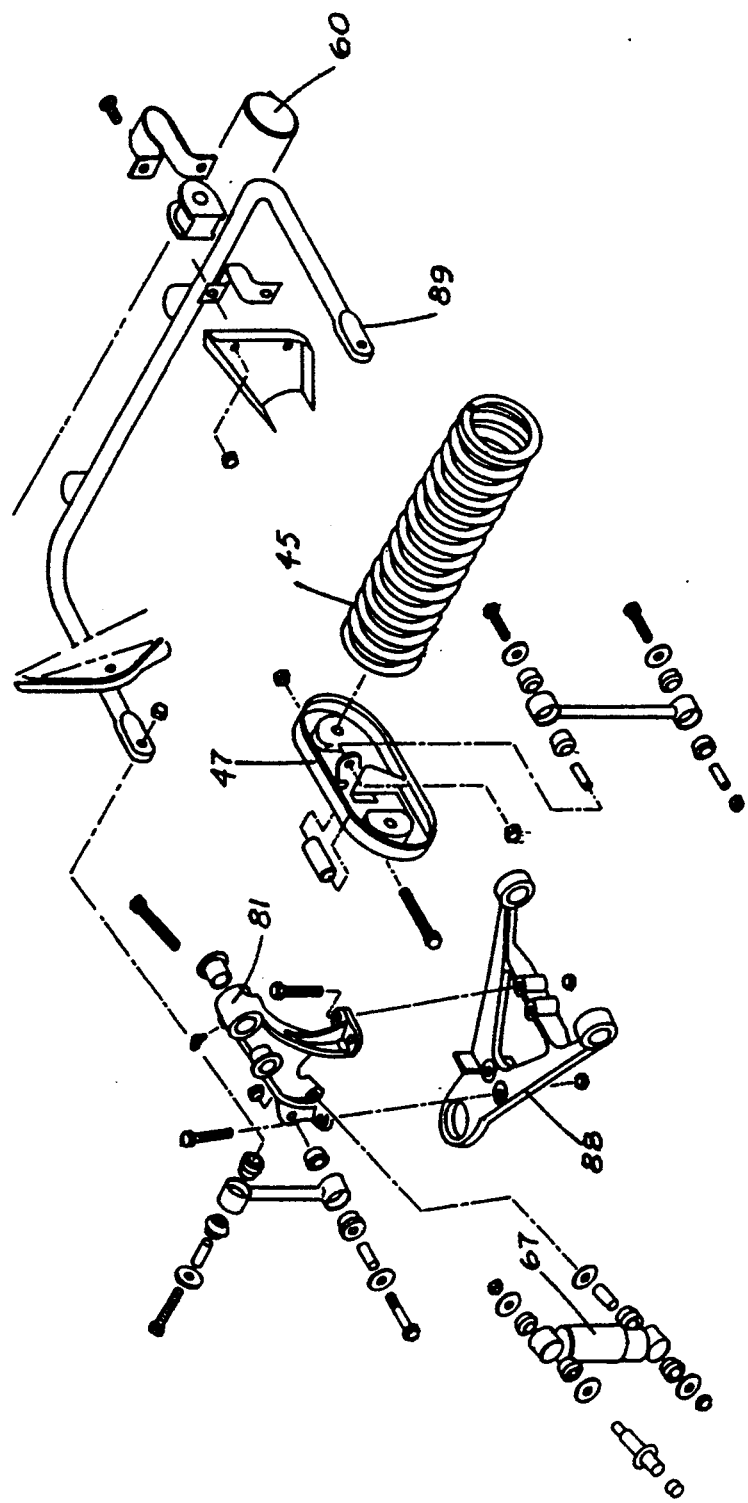
FIG. 9 is an exploded view of some of the components of the suspension system of the present invention including the anti-sway bar and its associated hardware.

In order to maintain a parallel relationship between the end cap faces 50 and 51, an additional mechanical linkage is employed. As seen in FIGS. 5 and 6, the cap face 50 of end cap 42 is formed so as to have an outwardly extending flange 55 which extends generally in the direction of the opposite end cap 47. Pivotably secured to the flange 55 is arm 56, which has a first end 57 secured to the flange 55 by fastener 58. A second, opposite end 59 is pivotably secured to vehicle frame member 60. A similar linkage 61 having a first end 63 is pivotably secured to flange 62 which extends from cap face 51. A second end 64 of linkage 62 is pivotably secured to frame member 60. As can be seen in FIG. 9, an anti-sway bar 89, familiar to those skilled in the art, is also utilized in the present system.

The operation of the aforesaid linkage configuration will now be discussed. When a load having an upward component is encountered, for example, by wheel 6, A-frame member 40 pushes end cap 42 generally in the direction of arrow 49. Due to the presence of pivoting joint 65 at the interface between cap 42 and member 40, the end cap 42 would normally tend to rotate about joint 65, thereby ejecting the springs 45 and 46. However, the cap cannot rotate upwardly because that would require the elongation of member 56, which is a rigid rod. The cap 42 cannot rotate downwardly, because that would require shortening or shrinking of member 56, which is also not possible. Thus, regardless of the deflections of wheels 6 and 7, and the degree of compression of the springs 45 and 46, the end cap faces 50 and 51 are mechanically constrained to remain substantially parallel to each other. Also present are conventional shock absorbers 66 and 67, which may function in the same manner as typical suspensions known in the art.

Figure 8:
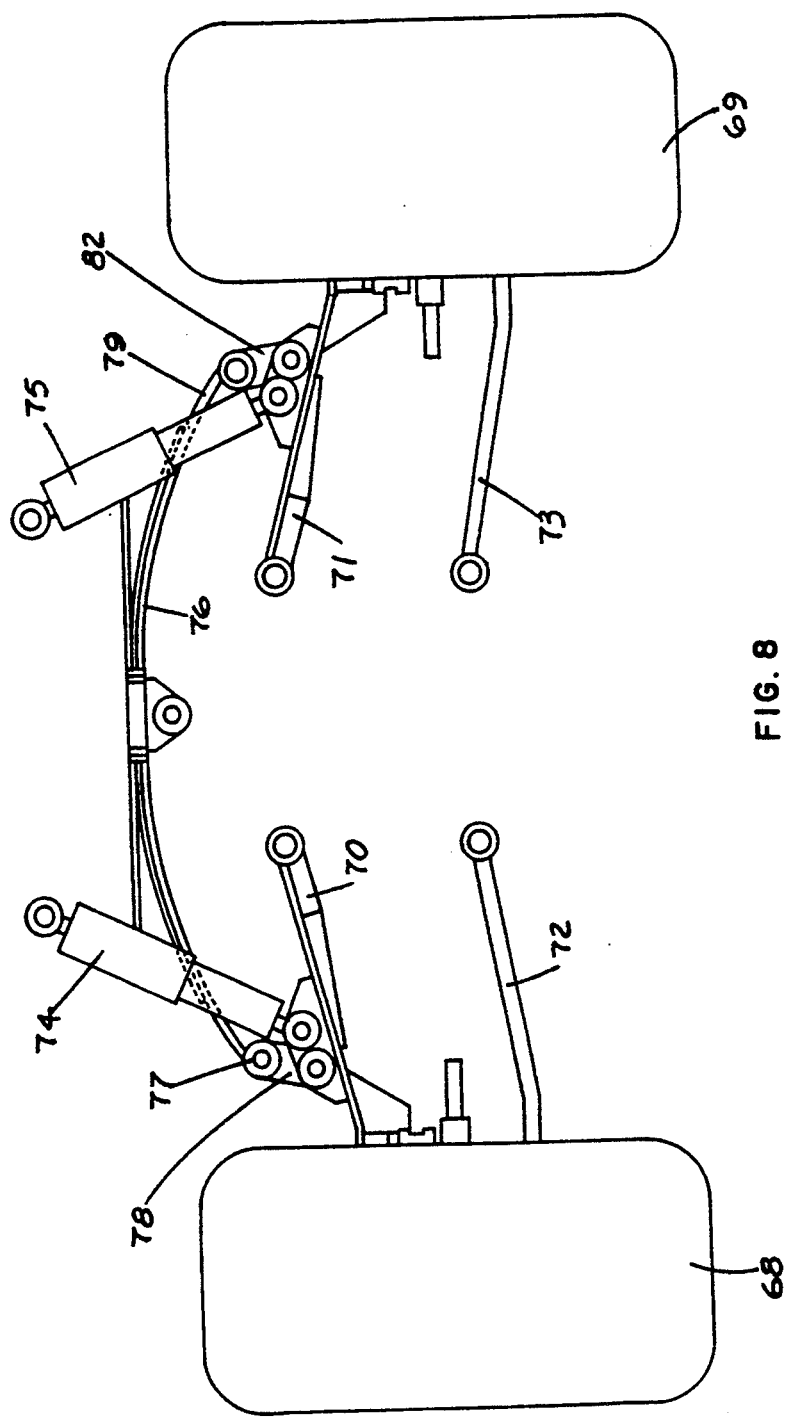
FIG. 8 is a front elevation view of an alternative embodiment suspension and steering system constructed in accordance with the principles of the present invention.

Referring now to FIG. 8, an alternative embodiment of the shock absorption system will now be described. Wheels 68 and 69 are pivotably attached to the vehicle frame (not shown) by a pair of upper support members 70 and 71 and a pair of lower support members 72 and 73. A pair of conventional shock absorbers 74 and 75 are pivotably connected to the upper support members 70 and 71, respectively. The major shock absorption function in response to vertical loads acting on wheels 68 and 69, however, is performed by leaf spring 76. A first end 77 of spring 76 is pivotally attached to flange 78 which is pivotally attached to support member 70. A second end 79 of spring 76 is pivotally attached to flange 82 which is pivotally attached to upper support member 71. A central region of leaf spring 76 is pivotably attached to the vehicle frame. In this manner, vertical loads applied to either wheel tend to straighten the spring 76, which responds with a reaction force which tends to urge the other wheel downwardly into contact with the ground, or lift the front portion of the vehicle (when the vehicle is traveling at slow speed).

Accordingly, the scope of this invention will be limited only by the appended claims.

What is claimed is:

1. An apparatus for controlling the motion of vehicle wheels, comprising:
   (a) a pair of coaxially mounted wheels, the wheels being pivotably mounted so as to permit motion in a direction substantially perpendicular to a mounting axis;
   (b) a pair of struts, the struts being pivotably affixed to the wheels so as to convert perpendicular motion of the wheels into a motion having a component parallel to the mounting axis;

(c) a spring supporting cradle, the cradle being formed so as to have two substantially planar end caps, each end cap being pivotably mounted on a free end of each strut, the end caps further comprising:
   (i) a first outer surface and a second inner surface; and
   (ii) a first flange, the first flange being rigidly attached to the outer surface of the end cap, the first flange being adapted to pivotably retain the free end of the strut;

(d) end cap stabilizing linkages, the stabilizing linkages being adapted to maintain the end caps in a substantially parallel relationship when subjected to mechanical forces imparted by the struts;

(e) a second flange, the second flange being rigidly affixed to the inner surface of the end cap, the second flange being adapted to pivotably retain an end of the stabilizing linkage; and (f) an elastic energy storage device, the elastic energy storage device being at least one coil spring, the elastic energy storage device being adapted to reside between the end caps.

2. The apparatus of claim 1 wherein the inner surface of the end cap further comprises a raised region, the raised region being adapted to retain a portion of the coil spring in a fixed relationship with the end cap.

3. The apparatus of claim 2, wherein the stabilizing linkage is formed as a rigid rod, the rod having a first end and a second end, the first end being pivotably affixed to the second flange of the end cap, and the second end being pivotably affixed to a vehicle frame member.

* * * * *